US009784319B2

(12) United States Patent
Nakamura

(10) Patent No.: US 9,784,319 B2
(45) Date of Patent: Oct. 10, 2017

(54) ROLLING BEARING UNIT WITH ROTATIONAL SPEED DETECTING DEVICE

(71) Applicant: NSK LTD., Tokyo (JP)

(72) Inventor: Yuji Nakamura, Fujisawa (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 15/121,828

(22) PCT Filed: Feb. 26, 2015

(86) PCT No.: PCT/JP2015/055710
§ 371 (c)(1),
(2) Date: Aug. 26, 2016

(87) PCT Pub. No.: WO2015/129827
PCT Pub. Date: Sep. 3, 2015

(65) Prior Publication Data
US 2017/0108049 A1    Apr. 20, 2017

(30) Foreign Application Priority Data

Feb. 28, 2014 (JP) ................... 2014-038325

(51) Int. Cl.
*F16C 41/00* (2006.01)
*F16C 19/18* (2006.01)
(Continued)

(52) U.S. Cl.
CPC ........ *F16C 41/007* (2013.01); *B60B 27/0005* (2013.01); *B60B 27/0068* (2013.01);
(Continued)

(58) Field of Classification Search
CPC .... F16C 19/186; F16C 33/723; F16C 41/007; F16C 2326/02; B60B 27/0005;
(Continued)

(56) References Cited

U.S. PATENT DOCUMENTS 8,356,940 B2 * 1/2013 Inoue ................... B60B 27/0005
384/448
8,764,299 B2 * 7/2014 Torii .................... B60B 27/0005
384/448
(Continued)

FOREIGN PATENT DOCUMENTS

DE   102013215621 A1   2/2014
JP   EP 1237004 A2 *   9/2002  ........... F16C 33/723
(Continued)

OTHER PUBLICATIONS

International Search Report, issued by International Searching Authority in corresponding International Application No. PCT/JP2015/055710, dated May 26, 2015. (PCT/ISA/210 & PCT/ISA/220).
(Continued)

*Primary Examiner* — Phillip A Johnson
(74) *Attorney, Agent, or Firm* — Sughrue Mion, PLLC

(57) ABSTRACT

There is provided a structure capable of sufficiently securing sealing performance by a cap (19a). In a state where a fitting insert (44) formed of a nonmagnetic material having a bottomed cylindrical shape is fixed to an inner diameter side of a cap cylindrical part (22a) constituting a cap body (20a) formed of a synthetic resin having a bottomed cylindrical shape, an axially outboard end opening of a through-hole (25a) formed in a cap bottom part (23a) of the cap body (20a) is closed by an axially inboard surface of an insert bottom part (48) of the fitting insert (44). An outer circumferential surface of an insert cylindrical part (47) of the fitting insert (44) is directly fitted into and fixed to an inner circumferential surface of an axially inboard end of an outer ring (2).

8 Claims, 12 Drawing Sheets

(51) Int. Cl.
| | | |
|---|---|---|
| *F16C 33/72* | (2006.01) | |
| *F16C 33/78* | (2006.01) | |
| *G01P 3/44* | (2006.01) | |
| *B60B 27/00* | (2006.01) | |
| *B60B 27/06* | (2006.01) | |

(52) U.S. Cl.
CPC ...... *B60B 27/0073* (2013.01); *B60B 27/0094* (2013.01); *F16C 19/186* (2013.01); *F16C 33/723* (2013.01); *F16C 33/783* (2013.01); *G01P 3/443* (2013.01); *B60B 27/065* (2013.01); *F16C 2233/00* (2013.01); *F16C 2326/02* (2013.01)

(58) Field of Classification Search
CPC ............ B60B 27/0068; B60B 27/0073; B60B 27/0094; G01P 3/443
See application file for complete search history.

(56) References Cited

U.S. PATENT DOCUMENTS

| | | |
|---|---|---|
| 2012/0177312 A1 | 7/2012 | Aritake et al. |
| 2013/0249273 A1 | 9/2013 | Norimatsu |

FOREIGN PATENT DOCUMENTS

| | | | | |
|---|---|---|---|---|
| JP | 2003-13982 A | | 1/2003 | |
| JP | 2003-200455 A | | 7/2003 | |
| JP | 2004052832 A | * | 2/2004 | ............ F16C 33/723 |
| JP | 2004-84848 A | | 3/2004 | |
| JP | 2005043127 A | * | 2/2005 | ............ F16C 33/723 |
| JP | 2005233234 A | * | 9/2005 | ............ F16C 33/723 |
| JP | 2006-308103 A | | 11/2006 | |
| JP | 2009133357 A | * | 6/2009 | ............ F16C 33/723 |
| JP | 2009-150436 A | | 7/2009 | |
| JP | 2011052755 A | * | 3/2011 | ......... B60B 27/0005 |
| JP | WO 2011027781 A1 | * | 3/2011 | ......... B60B 27/0005 |
| JP | 2011-80500 A | | 4/2011 | |
| JP | 2011242188 A | * | 12/2011 | ............ F16C 33/723 |
| JP | 2012-106547 A | | 6/2012 | |
| JP | 2013-221549 A | | 10/2013 | |
| JP | 5623592 B2 | * | 11/2014 | ............ F16C 33/723 |
| WO | 2014/026684 A1 | | 2/2014 | |

OTHER PUBLICATIONS

Written Opinion, issued by International Searching Authority in corresponding International Application No. PCT/JP2015/055710, dated May 26, 2015. (PCT/ISA/237).

Supplementary European Search Report dated Feb. 15, 2017 by the European Patent Office in counterpart European Application No. 15754573.2.

* cited by examiner

ROLLING BEARING UNIT WITH ROTATIONAL SPEED DETECTING DEVICE

TECHNICAL FIELD

The present invention relates to an improvement to a rolling bearing unit with a rotational speed detecting device, which is used for rotatably supporting a wheel (a non-driven wheel) of a vehicle on a suspension and for detecting a rotational speed of this wheel.

BACKGROUND ART

A rolling bearing unit is used to rotatably support a wheel of a vehicle on a suspension. To control an Anti-lock Braking System (ABS) or a Traction Control System (TCS), there is a need to detect a rotational speed of the wheel. For this reason, rotatably supporting the wheel on the suspension and detecting the rotational speed of this wheel using a rolling bearing unit with a rotational speed detecting device in which the rotational speed detecting device is incorporated into the rolling bearing unit have recently been widely adopted.

As an example of a conventional structure of the rolling bearing unit with the rotational speed detecting device used for this purpose, a structure shown in FIGS. 12 and 13 is described in Patent Document 1. The rolling bearing unit 1 with the rotational speed detecting device having this conventional structure rotatably supports a hub 3 which is a rotatable ring at an inner diameter side of an outer ring 2 which is a stationary ring.

The outer ring 2 include double rows of outer ring raceways 4a, 4b on an inner circumferential surface thereof, and a stationary-side flange 5 on an outer circumferential surface thereof. The outer ring 2 is supported by a knuckle (not shown) constituting the suspension and is not rotatable when used.

The hub 3 is formed by combining a hub body 6 and an inner ring 7 and includes double rows of inner ring raceways 8a, 8b on an outer circumferential surface thereof The hub 3 is supported at the inner diameter side of the outer ring 2 in the same center as this outer ring 2. Specifically, the inner ring raceway 8a of an axially outboard row is directly formed at an axially middle portion of an outer circumferential surface of the hub body 6, and similarly the inner ring 7, on an outer circumferential surface of which the inner ring raceway 8b of an axially inboard row is formed is fitted around and fixed to a small diameter step part 9 formed at an axially inboard end side portion (where the axially inboard side refers to a center side of a vehicle body in a width direction in a state assembled to the suspension, whereas the axially outboard side refers to an outboard side of the vehicle body in the width direction. This applies to the entire specification and claims). An axially inboard end face of the inner ring 7 is pressed by a caulking part 10 formed by plastically deforming an axially inboard end of the hub body 6 radially outward. A rotation-side flange 11 for supporting the wheel at an axially outboard end of the hub body 6 is provided at a portion which protrudes axially outward with respect to an axially outboard end opening of the outer ring 2.

A plurality of rolling elements 12, 12 are provided between the outer ring raceways 4a, 4b and the inner ring raceways 8a, 8b, respectively, and the hub 3 is rotatably supported on the inner diameter side of the outer ring 2.

An encoder 13 is fitted around and fixed to a portion deviating from the axially inboard ring raceway 8b inward at an axially inboard end of an outer circumferential surface of the inner ring 7. This encoder 13 is formed by combining a support ring 14, which is formed of a magnetic metal plate in an approximate L-shaped cross section and is of an annular shape as a whole, and an encoder body 16 which is attached to a side surface of a circular ring part 15 constituting this support ring 14. Since this encoder body 16 is formed of a permanent magnet such as a rubber magnet into which ferrite powder is mixed and is of a circular ring shape as a whole, it is magnetized in the axial direction, and changes directions of magnetization in an alternate manner at regular intervals in a circumferential direction. Therefore, S and N poles are disposed on an axially inboard surface or a detected surface of the encoder body 16 in an alternate manner at regular intervals.

A seal ring 17 is installed between the axially outboard end opening of the outer ring 2 and the outer circumferential surface of the axially middle portion of the hub body 6, and a cap 19 is mounted on an axially inboard end opening of the outer ring 2. Thereby, opposite end openings of a space 18 in which the rolling elements 12, 12 and the encoder 13 are installed are sealed, and grease enclosed within this space 18 is prevented from leaking out to an external space or foreign materials which are present in the external space are prevented from invading this space 18.

The cap 19 includes a bottomed cylindrical cap body 20 made by injection-molding a synthetic resin and a fitting ring 21 which is formed in an L-shaped cross section by stamping a non-magnetic metal plate and is of an annular shape as a whole. The cap body 20 includes a cap cylindrical part 22 and a cap bottom part 23 which closes an axially inboard end opening of the cap cylindrical part 22. The fitting ring 21 is fixed (molded) to an inner diameter side portion of a tip of the cap cylindrical part 22. A mount part 24 expanded axially inward (increased in an axial thickness dimension) compared to the other portion is provided at a radially outer side portion of the cap bottom part 23. A portion of the mount part 24 which axially faces the detected surface of the encoder 13 (the encoder body 16) is formed with a through-hole 25 which axially penetrates there through. A bottomed cylindrical sensor insertion cup 26 made of a non-magnetic stainless steel plate is molded into the through-hole 25. This sensor insertion cup 26 is buried in the mount part 24 by insert-molding at the injection molding of the cap body 20. Further, a mounting nut 27, on an inner circumferential surface of which internal threads are formed, is also buried in a portion of the mount part 24 which deviates from the through-hole 25 by insert-molding.

A sensor unit 28 for detecting a rotational speed is supported and fixed to the cap 19. The sensor unit 28 includes a sensor 29 and a sensor holder 30. Since a magnetism detecting element such as a Hall element, a magnetic resistance element, or the like is provided for a detector, the sensor 29 changes an output signal in response to a change in characteristics of the detected surface of the encoder 13. The sensor holder 30 is formed by injection-molding a synthetic resin and includes an insertion part 31 for holding the sensor 29 and a mounting flange part 32 for fixing the cap 19. This sensor unit 28 is fixed to the cap 19 (the mount part 24) by screwing an external thread part of a bolt 34, which is inserted into a through-hole formed in the mounting flange part 32, onto an internal thread part of the mounting nut 27 in a state where the insertion part 31 is inserted to the sensor insertion cup 26.

According to the rolling bearing unit 1 with the rotational speed detecting device of the conventional structure having the configuration as described above, the wheel fixed to the hub 3 can be rotatably supported with respect to the suspension supporting the outer ring 2. When the encoder 13 is rotated together with the hub 3 with the rotation of the wheel, the N and S poles which are present on the detected surface of the encoder 13 alternately pass through the vicinity of a detection part of the sensor 29 facing the detected surface of the encoder 13 via a bottom plate part 35 of the sensor insertion cup 26. As a result, a direction of magnetic flux flowing in the magnetism detecting element constituting the sensor 29 is alternately changed, and a characteristic of this magnetism detecting element is alternately changed. In this way, a frequency at which the characteristic of the magnetism detecting element is changed is proportional to the rotational speed of the hub 3. Thus, when the output signal of the sensor 29 is sent to a controller (not shown), the ABS or the TCS can be suitably controlled. In the conventional structure, even in a state before the sensor unit 28 is assembled on an assembly process of, for instance, a vehicle builder, since the space 18 in which the encoder 13 is installed can be sealed by the cap 19 (and the sensor insertion cup 26), it is possible to effectively prevent foreign materials from sticking to this encoder 13.

However, in the conventional structure as described above, there is a possibility of causing the following problems.

That is, in the conventional structure, a set of upper and lower molding dies 36, 37 as shown in, for instance, FIG. 14 is used to manufacture the cap 19. Specifically, a molten synthetic resin is fed into a cavity 38 which is defined with these upper and lower molding dies 36, 37 brought into axially contact with each other and has a shape matched with an outer surface shape of the cap 19. Particularly, in the conventional structure, the synthetic resin is fed with the sensor insertion cup 26 set in this cavity 38 (insert molding is performed). When this insert molding is performed, the bottom plate part 35 constituting this sensor insertion cup 26 is brought into contact with a part of the lower molding die 37 in order to regulate a position at which the sensor insertion cup 26 is installed, and similarly a part of the upper molding die 36 is butted against (bitten into) an axially inboard surface (curved surface) of a bent part 41 which is a connecting part between a cylindrical part 39 and a flange part 40 which constitute the sensor insertion cup 26.

When the insert molding is performed in the way as described above, the cylindrical part 39 of this sensor insertion cup 26 may be elastically deformed (expanded) radially outward based on a pressing force for the sensor insertion cup 26 of the upper molding die 36. Injection molding is performed in this state, and thereafter, when the cap 19 is extracted from the cavity 38 (when the pressing force caused by the upper molding die 36 is removed), since the cylindrical part 39 is elastically restored (reduced in its diameter), there is a possibility of a gap occurring at a coupling surface between the outer circumferential surface of the cylindrical part 39 and a portion of the synthetic resin which is present around this cylindrical part 39. When a foreign material such as water is invaded into this gap, there is a possibility that this foreign material further progresses axially outward to enter from an axially inboard end of the coupling surface to the space 18.

Incidentally, when the synthetic resin is cooled and solidified, it is contracted by a reduction in volume, which is generally known. For this reason, it is also thought that a portion, which is present around this cylindrical part 39, of a synthetic resin of which the cap body 20 is formed is contracted, and thereby the gap resulting from the above-described cause is extinguished and reduced. However, an inner diameter dimension of the through-hole 25 is typically about 10 mm, and an amount of contraction associated with the solidification is slight. For this reason, it is difficult to completely extinguish the gap.

PRIOR ART DOCUMENT

Patent Document

Patent Document 1: JP-A-2011-80500

SUMMARY OF THE INVENTION

Problem to be Solved

The present invention has been made in view of the above circumstances and provides a rolling bearing unit with a rotational speed detecting device capable of sufficiently securing sealing performance by a cap.

Means for Solving the Problem

A rolling bearing unit with a rotational speed detecting device of the present invention is used to rotatably support a wheel for a non-driven wheel on a suspension such as a knuckle and includes an outer ring, a hub, a plurality of rolling elements, an encoder, a cap, and a sensor unit.

The outer ring includes double rows of outer ring raceways in an inner circumferential surface thereof and is not rotatable when used.

The hub includes double rows of inner ring raceways on an outer circumferential surface thereof, is supported concentrically with the outer ring at an inner diameter side of the outer ring and is provided with a rotation-side flange for supporting a wheel at a portion of an outer circumferential surface which axially protrudes outward with respect to an axially outboard end of the outer ring.

The plurality of rolling elements are rollably provided for each row between the outer ring raceways and the inner ring raceways, respectively.

The encoder is configured by alternately changing magnetic characteristics on an axially inboard surface thereof and is supported to an axially inboard end of the hub concentrically with the hub.

The cap is mounted on an axially inboard end of the outer ring and closes an axially inboard end opening of the outer ring.

The sensor unit includes a sensor and a sensor holder.

The sensor is provided to face a detected surface of the encoder and configured to change an output signal in response to a change in characteristic of the detected surface of the encoder.

The sensor holder includes a sensor holding part which holds the sensor and is supported by a portion of the cap axially facing the encoder, and a sensor mounting flange part which is provided at a base end of the sensor holding part and is coupled and fixed to an axially inboard surface of the cap.

Particularly, in the rolling bearing unit with the rotational speed detecting device of the present invention, the cap includes a cap body, a fitting insert, and a mounting nut.

The cap body is formed of a synthetic resin as a whole, has a bottomed cylindrical shape including a cap cylindrical part and a cap bottom part, and is formed with a through-hole in a portion of the cap bottom part which axially faces the encoder.

The fitting insert is formed of a non-magnetic material as a whole, has a bottomed cylindrical shape including an insert cylindrical part and an insert bottom part, and is fixed to an inner diameter side of the cap cylindrical part in a state where the fitting insert is open axially outward and an axially outboard end opening of the through-hole is closed by the insert bottom pan.

The mounting nut is molded in the cap body in a state where the mounting nut is open to an axially inboard surface of the cap body and is used to screw a bolt inserted through a hole of the sensor mounting flange part in a state where the sensor holding part is inserted to the through-hole.

The cap is mounted on an axially inboard end of the outer ring in a state where the insert cylindrical part of the fitting insert is fitted into and fixed to the axially inboard end of the outer ring.

In implementing the present invention, preferably, an axial thickness dimension of a portion of the insert bottom part of the fitting insert, which axially faces the through-hole is smaller than a thickness dimension of a remaining portion of the insert bottom part other than the portion.

In implementing the present invention, preferably, a seal member is provided at a portion between an inner circumferential surface of the through-hole and an outer circumferential surface of the sensor holding part.

In implementing the present invention, preferably, the mounting nut has a tubular shape, both ends of which are axially open. An axially inboard end opening of the mounting nut is open to an axially inboard surface of the cap bottom part, and the mounting nut is disposed in a state where an axially outboard end opening thereof is closed by the insert bottom part.

In implementing the present invention, preferably, an anti-rotation structure for prohibiting relative rotation between the fitting insert and the cap body by engagement between the fitting insert and the cap body in a circumferential direction is provided between the fitting insert and the cap body.

In implementing the present invention, preferably, a retaining mechanism for prohibiting axial relative displacement between the fitting insert and the cap body by axial engagement between the fitting insert and the cap body is provided between the fitting insert and the cap body.

In implementing the present invention, preferably, the insert cylindrical part is directly fitted into the axially inboard end of the outer ring.

When the insert cylindrical part is directly fitted into the axially inboard end of the outer ring, preferably, a concave groove, which is open to an axially outboard side and a radially inner side, is formed throughout an inner circumferential surface of an axially outboard end of the cap cylindrical part. In a state where an axially outboard end face of the cap cylindrical part comes into contact with an axially inboard end face of the outer ring, an annular seal member is fitted around a portion, which radially overlaps the concave groove, of the outer circumferential surface of the insert cylindrical part, and is axially sandwiched between the axially inboard end face of the outer ring and an axial side surface of the concave groove.

Advantage of the Invention

According to the present invention configured as described above, sealing performance by the cap can be sufficiently secured.

That is, in the present invention, in the state where the cap is mounted on the axially inboard end of the outer ring by the insert cylindrical part of the fitting insert, the cap closes the axially outboard end opening of the through-hole formed in the cap bottom part. Therefore, even when a foreign material such as water is invaded into an axially outboard end of the portion between the outer circumferential surface of the sensor holder and the inner circumferential surface of the through-hole, this foreign material can be prohibited from being invaded into the space in which the rolling elements or the encoder is installed by the axially inboard surface of the insert bottom part. That is, the formation of the gap connected to the space in which the encoder is installed between the through-hole provided in the cap body and the sensor insertion ring fitted into this through-hole, which becomes the problem in the above-described conventional structure, can be avoided. Therefore, according to the present invention, sealing performance by the cap can be sufficiently secured.

The axial thickness dimension of the portion of the insert bottom part of the fitting insert, which axially faces the through-hole, is smaller than the thickness dimension of the remaining portion of the insert bottom part other than the portion. Therefore, even when a thickness dimension of the metal plate forming this fitting insert is increased to secure rigidity of the fitting insert, detection accuracy of the sensor is improved by reducing the axial distance between the sensor held in the sensor holder and the encoder.

The seal member is provided at the portion between the inner circumferential surface of the through-hole of the cap body and the outer circumferential surface of the sensor holder. Therefore, a foreign material such as water is effectively prevented from being invaded into the relevant portion. As a result, the water invaded into the relevant portion is prevented from being frozen and expanded to damage the sensor, or a gap is prevented from occurring at a coupled part between the fitting insert and the cap body.

The mounting nut has the tabular shape, both ends of which are axially open. Therefore, in comparison with a mounting nut having a structure in which one axial end thereof is closed, an internal thread part can be easily machined by, for instance, rolling, and a manufacturing cost is reduced. In a state where the mounting nut is molded in the cap bottom part, the axially outboard end opening of the mounting nut is closed by the fitting bottom part. Therefore, even when a foreign material such as water is invaded into the axially outboard end of the portion between the inner circumferential surface (the internal thread part) of the mounting nut and the outer circumferential surface (the external thread part) of the bolt, this foreign material can be prohibited from being invaded into the space in which the rolling elements or the encoder is install by the axially inboard surface of the insert bottom part. Accordingly, the sealing performance by the cap can be sufficiently secured.

The anti-rotation mechanism or the retaining mechanism is provided between the fitting insert and the cap body. Therefore, a coupling and fixing force between the fitting insert and the cap body can be made strong.

The insert cylindrical part is directly fitted into the axially inboard end of the outer ring. Therefore, like when this insert cylindrical part is fitted into the axially inboard end of the outer ring via the cap cylindrical part of the cap body made of a synthetic resin, the cap cylindrical part is unlikely to be deformed in use, and no gap is likely to occur between the inner circumferential surface of the outer ring and the outer circumferential surface of the cap cylindrical part.

Therefore, the sealing performance by the cap can be sufficiently secured.

If the annular seal member is fitted around a portion of the outer circumferential surface of the insert cylindrical part, which radially overlaps the concave groove in the outer circumferential surface of the axially outboard end of the insert cylindrical part is formed, a foreign material such as water can be effectively prevented from being invaded into the fitting portion between the outer circumferential surface of the insert cylindrical part and the inner circumferential surface of the axially inboard end of the outer ring.

DETAILED DESCRIPTION OF EMBODIMENTS

First Example of Embodiment

Figure 1:
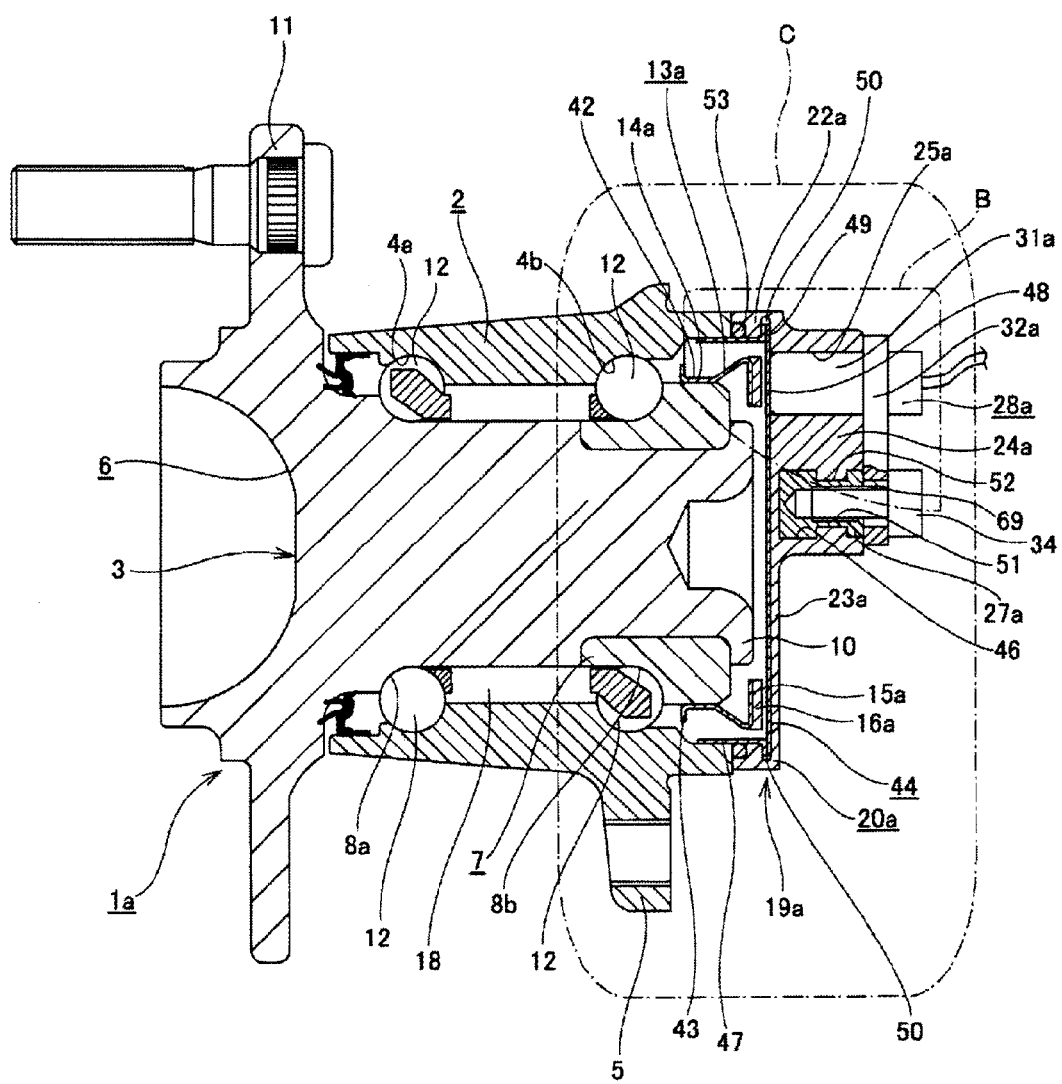
FIG. 1 is a cross-sectional view showing a rolling bearing unit with a rotational speed detecting device according to a first example of an embodiment of the present invention.
Figure 2A:
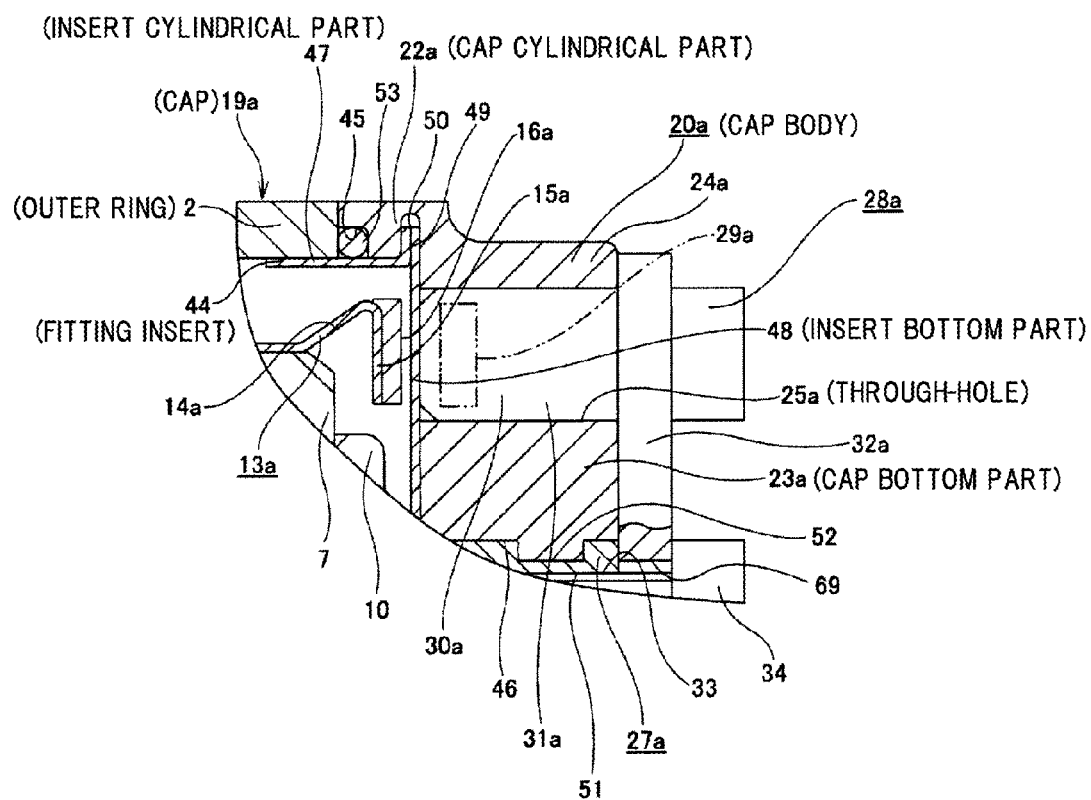
FIG. 2A is an enlarged view of a part B of FIG. 1.
Figure 2B:
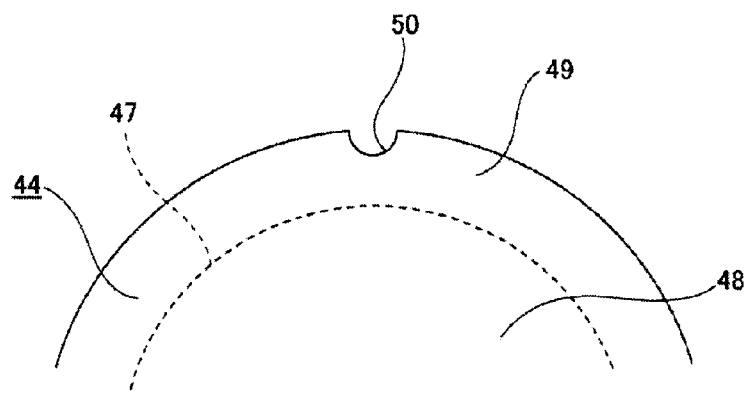
FIG. 2B is a view when a fitting insert is extracted from the rolling bearing unit with the rotational speed detecting device of FIG. 1 and a part thereof in a circumferential direction is viewed from an axially inboard side.
Figure 3:
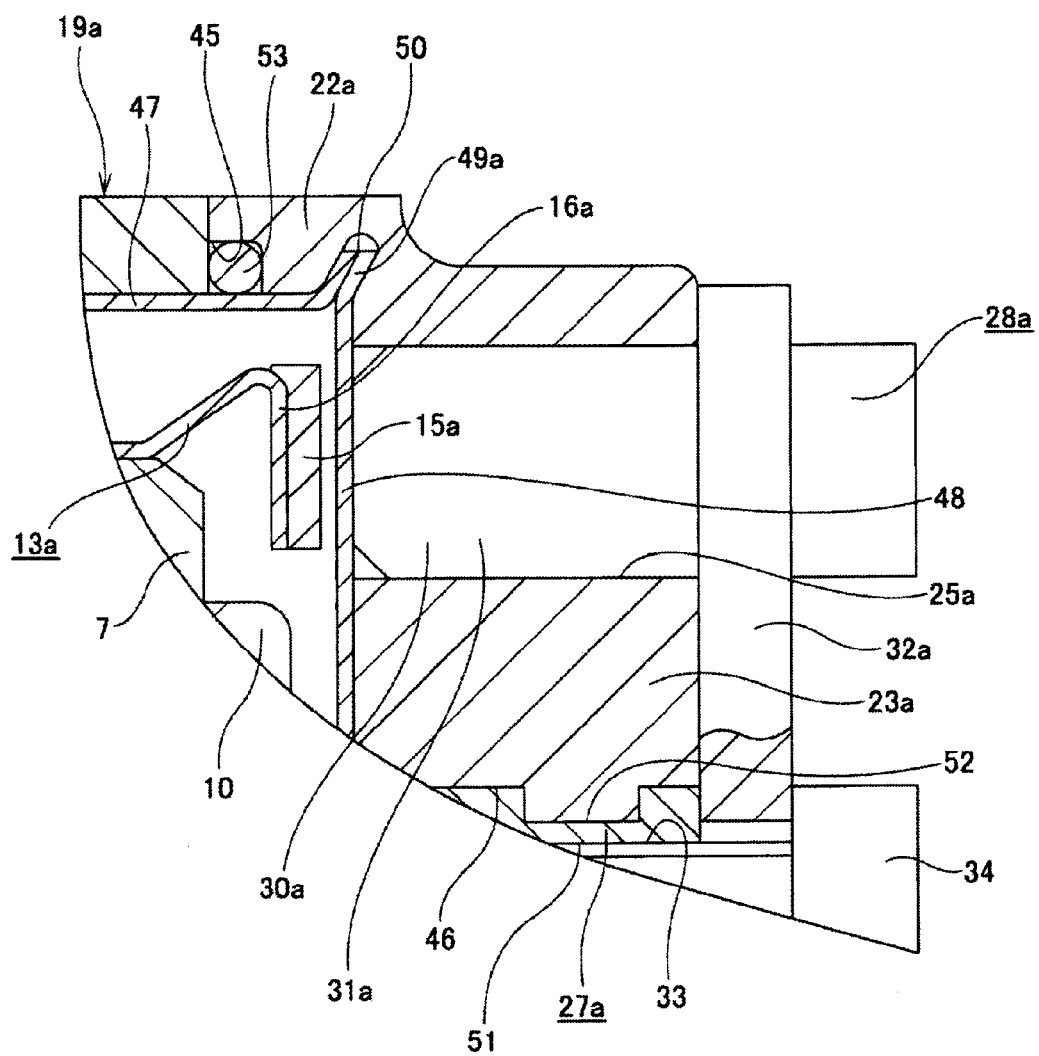
FIG. 3 is a view showing another example of a shape of a flange part of the fitting insert in the rolling bearing unit with the rotational speed detecting device of FIG. 1.
Figure 4A:
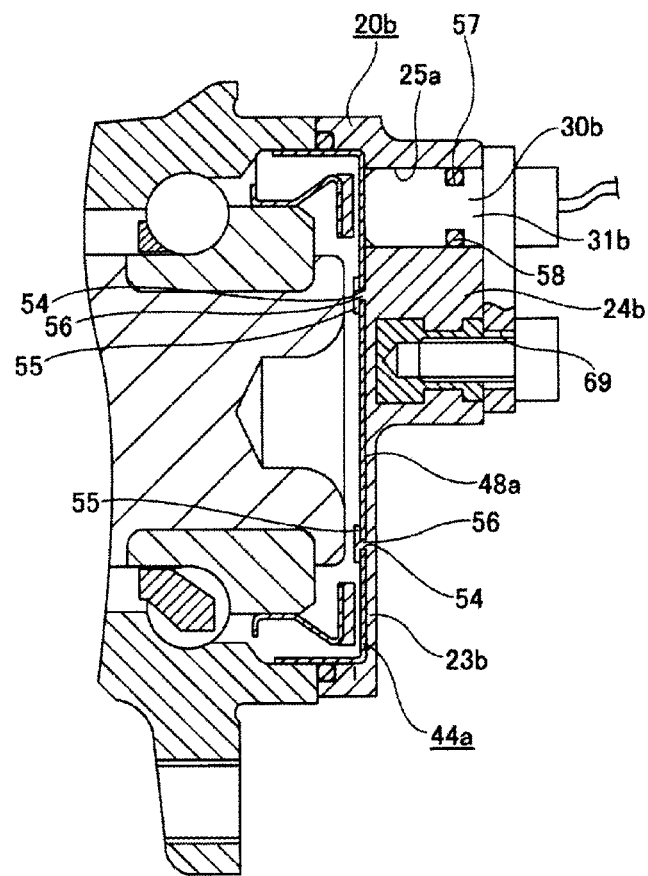
FIG. 4A is a view showing a portion which corresponds to a part C of FIG. 1 in a rolling bearing unit with a rotational speed detecting device according to a second example of the embodiment of the present invention.
Figure 4B:
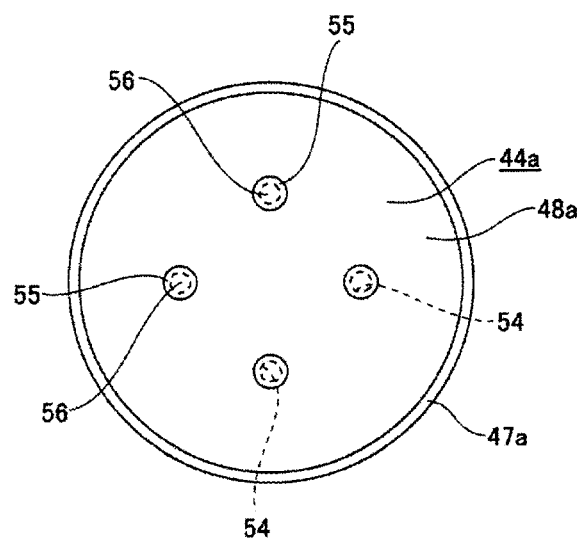
FIG. 4B is a view of the fitting insert in the rolling bearing unit with the rotational speed detecting device of FIG. 4A when viewed from an axially outboard side.

FIGS. 1 to 3 show a first example of an embodiment of the present invention. A feature of this example is that a structure of a cap 19a for closing an axially inboard end opening of an outer ring 2 is devised. Since structures and operational effects of other portions are basically the same as in the above-described conventional structure, overlapping illustration and description will be omitted or simplified. The following description is based on characteristic portions of this example and the portions which are not described previously.

A rolling bearing unit la with a rotational speed detecting device of this example rotatably supports a wheel which is a non-driven wheel on a suspension such as a knuckle, detects a rotational speed of this wheel, and rotatably supports a hub 3 which is a rotatable ring at an inner diameter side of the outer ring 2 which is a stationary ring via a plurality of rolling elements 12, 12.

The outer ring 2 and a hub body 6 constituting the hub 3 are made of medium-carbon steel such as S53C, and a hardening treatment such as high-frequency hardening is performed at least on surfaces of raceways 4a, 4b, 8a. On the other hand, an inner ring 7 constituting the hub 3 and each of the rolling elements 12, 12 are made of high carbon-chromium bearing steel such as SUJ2, and is subjected to a hardening treatment caused by, for instance, through quenching. The rolling elements 12 are not limited to balls as shown in FIG. 1. When the rolling bearing unit la with the rotational speed detecting device of this example is used for a heavy vehicle, tapered rollers may be used as the rolling elements 12.

An encoder 13a is fitted around and fixed to (press-fitted into and fixed to) an axially inboard end (a right end of FIG. 1) of an outer circumferential surface of the inner ring 7. This encoder 13a includes a support ring 14a and an encoder body 16a. The support ring 14a is formed in an approximately L-shaped cross section in an annular shape as a whole by stamping ferritic stainless steel plate such as SUS430 or a cold rolled steel plate such as SPCC on which a rust prevention treatment is performed. The support ring 14a includes a tubular fitting cylinder part 42, an outward flange part 43 provided in a state it is bent radially outward from an axially outboard end (a left end of FIG. 1) of the fitting cylinder part 42, and a circular ring part 15a provided in a state where it is bent radially inward from an axially inboard end of the fitting cylinder part 42. The fitting cylinder part 42 is provided with a small diameter part which is provided at an axially outboard half part and is directly fitted around the axially inboard end of the inner ring 7, and a tapered part which is provided at an axially inboard half part and is inclined in a direction in which an outer diameter dimension is increased toward the axially inboard side. In this example, in a state where this support ring 14a is press-fitted into the axially inboard end of the inner ring 7 in the axial direction, an axial position of the support ring 14a is regulated such that an axially inboard surface of the circular ring part 15a and an axially inboard end face of the outer ring 2 are located on the same virtual plane. Since the whole of the encoder body 16a is formed in a circular ring shape by a rubber magnet in which a magnetic material such as ferrite powder is mixed or a permanent magnet such as a plastic magnet, the encoder body 16a is magnetized in the axial direction, and a direction of the magnetization is changed in an alternate manner at regular intervals in a circumferential direction.

In a state where this encoder body 16a is attached to the axially inboard surface of the circular ring part 15a, an axially inboard surface (a detected surface) of this encoder body 16a is located at the axially inboard side with respect to an axially inboard end face of a caulking part 10 formed at an axially inboard end of the hub body 6.

The cap 19a mounted on an axially inboard end of the outer ring 2 includes a cap body 20a made of a synthetic resin, a fitting insert 44 which is disposed inside this cap body 20a and is made of a metal, and a mounting nut 27a disposed (inserted) in this cap body 20a.

The cap body 20a is made, for example, by injection-molding a polyamide resin mixture material in which fiberglass is adequately added to a polyamide 66 resin. If an amorphous aromatic polyamide resin (modified polyamide 6T/6I) and a low water-absorbing aliphatic polyamide resin (a polyamide 11 resin, a polyamide 12 resin, a polyamide 610 resin, or a polyamide 612 resin) are adequately added to a polyamide resin, water resistance can be further improved.

The cap body 20a made in this way is formed in the shape of a bottomed cylinder including a cap cylindrical part 22a and a cap bottom part 23a closing an axially inboard end opening of this cap cylindrical part 22a.

A concave groove 45, which has a rectangular cross section and is open to the axially outboard side and the radially inner side, is formed throughout an inner circumferential surface of an axially outboard end of the cap cylindrical part 22a. An outer diameter side portion from an axially outboard end opening of the concave groove 45 of an axially outboard end face of the cap cylindrical part 22a is formed in a flat surface shape to abut against the axially inboard end face of the outer ring 2.

A portion of the cap bottom part 23a in a circumferential direction is provided with a mount part 24a which is expanded axially inward with respect to the other portion (or whose axial thickness dimension is increased). A portion of the mount part 24a which axially faces the detected surface of the encoder 13a (the encoder body 16a) in an assembled state is formed with a through-hole 25a which axially penetrates therethrough. A holding hole part 46 for holding the mounting nut 27a at an inner side thereof is provided at a position of the mount part 24a which is shifted from the through-hole 25a to the radially inner side. This holding hole part 46 has the shape of a bottomed cylinder in which an axially inboard end thereof is open and an axially outboard end is closed, and is formed by insert-molding the mounting nut 27a in the cap bottom part 23a as will be described below.

The fitting insert 44 is formed in a bottomed cylindrical shape (in cross-sectional shape having an approximately C-shaped petri dish shape) by stamping a non-magnetic metal plate such as an austenitic stainless steel plate or aluminum based alloy plate. This fitting insert 44 includes an insert cylindrical part 47, an insert bottom part 48 which closes an axially inboard end opening of this insert cylindrical part 47, and a flange part 49 which corresponds to a retaining mechanism of the claims. This flange part 49 is formed in a state where it is bent radially outward from an axially inboard end of the insert cylindrical part 47 at right angles and its middle portion is folded back 180° radially inward. A radially inner end of the flange part 49 is continuous with a radially outer end of the insert bottom part 48. In this example, axially inboard surfaces of the flange part 49 and the insert bottom part 48 are mutually located on the same plane. The flange part 49 may be formed, for instance, in a state where it is inclined axially inward toward the radially outer side like a flange part 49a shown in FIG. 3. When the flange part 49a inclined axially inward is formed, if the flange part 49a is formed such that the entire insert bottom part 48 is pulled radially outward, the flatness of this insert bottom part 48 is improved.

Anti-rotation notches 50, 50 which constitute an anti-rotation structure of the claims are formed at a plurality of circumferential places of a radially outer edge of the flange part 49 in a state where they are open to axially inboard and outer sides of the flange part 49 and to the radially outer edge of the flange part 49. Each of the anti-rotation notches 50, 50 is formed by cutting or a part of the flange part 49 in the circumferential direction in a non-circular shape or bending (crushing) the part radially inward.

The fitting insert 44 having this configuration is molded at an inner diameter side of the cap cylindrical part 22a of the cap body 20a and at an axially outboard side of the cap bottom part 23a at injection molding of the cap body 20a, and thereby is fixed to this cap body 20a.

Specifically, an axially inboard half part of the insert cylindrical part 47 is fixed to the inner diameter side of the cap cylindrical part 22a with the flange part 49 buried in the cap cylindrical part 22a, and similarly an axially outboard half part of the insert cylindrical part 47 protrudes axially outward with respect to the axially outboard end face of this cap cylindrical part 22a. An axially inboard surface of the insert bottom part 48 is fixed to an axially outboard surface of the cap bottom part 23a. In this state, an axially outboard end opening of this cap bottom part 23a of the through-hole 25a is closed by a part of the axially inboard surface of the insert bottom part 48 (where a part of the axially inboard surface of the insert bottom part 48 is exposed to the through-hole 25a).

In the fixed state as described above, the axially inboard and outboard sides of the flange part 49 and the cap body 20a are axially engaged, and thereby axial relative displacement between the fitting insert 44 and the cap body 20a is prohibited. The both sides of the flange part 49 in the circumferential direction of each of the anti-rotation notches 50, 50 and a portion of the cap body 20a which is filled inside each of the anti-rotation notches 50, 50 are engaged in the circumferential direction, and thereby relative rotation between the fitting insert 44 and the cap body 20a is prohibited.

The mounting nut 27a has the shape of a bottomed cylinder, on an inner circumferential surface of which an internal thread part 51 is formed and in an outer circumferential surface of which a concave groove 52 is formed throughout the circumference of an axially middle part, and is buried in a portion corresponding to the holding hole part 46 of the mount part 24a.

As described above, in a state where the mounting nut 27a is buried in the cap body 20a, axially inboard and outboard sides of the concave groove 52 and a portion of this cap body 20a which is filled inside the concave groove 52 are axially engaged, and thereby displacement of the mounting nut 27a with respect to the cap body 20a is prohibited.

An axially inboard end face of the mounting nut 27a is located on the same virtual plane as an axially inboard surface of the mount part 24a, and the internal thread part 51 is open to the axially inboard surface of the mount part 24a. Herein, since an axial dimension of the mounting nut 27a is shorter than an axial dimension of the mount part 24a, an axially outboard end face of the mounting nut 27a is buried in the mount part 24a in a state where it is located inside in the axial direction with respect to an axially outboard end face of the cap bottom part 23a. The axially outboard end face of the mounting nut 27a may be located on the same virtual plane as the axially outboard end face of the cap bottom part 23a.

Figure 14:
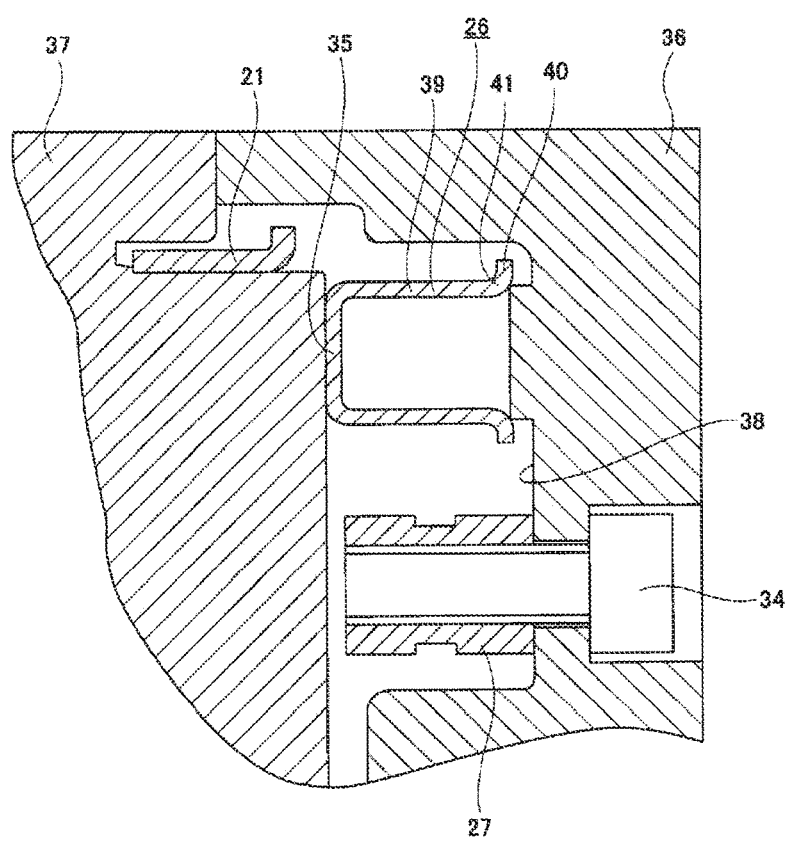
FIG. 14 is a partial cross-sectional view of a molding die, showing a process of manufacturing a cap in the conventional rolling bearing unit with the rotational speed detecting device.

In this example, the mounting nut 27a has a structure (a cap nut) in which it is not penetrated in the axial direction. For this reason, the mounting nut 27a does not need to be screwed on the external threads as shown in FIG. 14 at the insert molding, and workability of the insert molding can be improved. On the other hand, when the mounting nut has a structure in which it is penetrated in the axial direction, insert molding is performed in a state where the mounting nut is screwed on external threads (see FIG. 14) such that no resin is thrust into this mounting nut. However, even when the mounting nut penetrated in the axial direction is used as in a fifth example of the embodiment which will be described below, if the insert molding is performed in a state where the axially outboard end opening of this mounting nut is closed with the axially inboard surface of the insert bottom part, there is no need to be screwed on the external thread pan like the structure in which the mounting nut is not penetrated in the axial direction.

A method of fixing the mounting nut 27a to the cap body 20a is not limited to the insert molding. A nut insertion hole, which has a bottomed cylindrical shape and in an inner circumferential surface of which a locking concave groove which is long in the axial direction is formed, may be formed in a portion of the cap body 20a which corresponds to the holding hole part 46, and a mounting nut, on an outer circumferential surface of which a locking convex ridge which is long in the axial direction, or the like is provided, may be pressed into the nut insertion hole in a state where phases of the locking convex ridge and the locking concave groove are aligned. Alternatively, a nut, on an outer circumferential surface of which convex ridges such as serration which are long in the axial direction are formed, may be pressed into a nut insertion hole, which is formed in the shape of a bottomed cylinder, in an inner circumferential surface of which concave grooves or the like are not formed, and the nut may be locked by forming the concave grooves in the inner circumferential surface of the nut insertion hole according to the convex ridges.

The cap 19a having the configuration as described above can be formed by injection molding (axial draw molding) using a device provided with a molding die insertion part, which has an outer circumferential surface shape matched with the inner circumferential surface shape of the through-hole 25a, for a part of one of the pair of molding dies (the upper molding die 36 and the lower molding die 37) as shown in FIG. 14 in a state where the mounting nut 27a and the fitting insert 44 are disposed in the cavity 38 defined between these molding dies.

The cap 19a having the configuration as described above is assembled to the outer ring 2 by directly fitting (metal fitting) the outer circumferential surface of the axially outboard half part of the fitting insert 44 into the inner circumferential surface of the axially inboard end of the outer ring 2 and by abutting the axially outboard end face of the cap cylindrical part 22a against the axially inboard end face of the outer ring 2 in a state where a O-ring 53, which is formed of a rubber in a circular cross-sectional shape and which corresponds to an annular seal member in the claims, is mounted on (fitted around) a portion which radially overlaps the concave groove 45 of the cap cylindrical part 22a out of the outer circumferential surface of the insert cylindrical part 47. In this assembled state, the axially outboard surface of the insert bottom part 48 closely faces the detected surface of the encoder 13a via a predetermined axial gap (an air gap).

In the assembled state as described above, the O-ring 53 is sandwiched between an axial side surface of the concave groove 45 and the axially inboard end face of the outer ring 2 in a state where it is axially compressed. For this reason, even when a foreign material such as water is invaded from a abutting part between the axially outboard end face of the cap cylindrical part 22a and the axially inboard end face of the outer ring 2, this foreign material is effectively prevented from reaching a metal fitting part between the outer circumferential surface of the insert cylindrical part 47 and the inner circumferential surface of the axially inboard end of the outer ring 2 due to the O-ring 53.

In this example, an end of a coupling surface between the cap body 20a and the fitting insert 44 of the cap 19a (a boundary surface between both the members 20a, 44) is not present in the space 18 in which the rolling elements 12, 12 or the encoder 13a is installed. That is, the coupling surface is not provided in a state where it is directly continuous with (exposed to) this space 18. For this reason, for example, a foreign material such as water invaded from a portion or the like between the inner circumferential surface of the through-hole 25a of the mount part 24a and an outer circumferential surface of a sensor holder 30a (to be described below) is not invaded into the space 18 along a gap occurring at the coupling surface between the cap body 20a and the fitting insert 44. In this example, an axially outboard end of the coupling surface is located at a radially inner end of the axial side surface of the concave groove 45. For this reason, even when a foreign material such as water is invaded up to the position along the gap occurring at the coupling surface between the cap body 20a and the fitting insert 44, the foreign material can be prevented from being invaded into the space 18 by the O-ring 53.

In this example, a sensor unit 28a for detecting a rotational speed is supported and fixed to the cap 19a having the configuration as described above. This sensor unit 28a includes a sensor 29a and a sensor holder 30a. Since the sensor 29a installs therein a magnetism detecting element such as a Hall element, a magnetic resistance element, or the like on a detector, the sensor 29a changes an output signal in response to a change in characteristics of the detected surface of the encoder 13a. Since the sensor holder 30a is formed by injection-molding a synthetic resin such as a polyamide resin, the sensor holder 30a includes an insertion part 31a which holds the sensor 29a at a tip thereof (an axially outboard end thereof), has an outer diameter dimension equal to or slightly smaller than an inner diameter dimension of the through-hole 25a of the cap bottom part 23a, corresponds to a sensor holding part in the claims, and has an approximately column shape (a rod shape), and a mounting flange part 32a which is provided at a base end of this insertion part 31a and is intended to be fixed to the cap 19a. This sensor unit 28a is fixed to the cap 19a (the mount part 24a) by screwing an external thread part 33 of a bolt 34, which is inserted into a through-hole 69 formed in the mounting flange part 32a, to an internal thread part 51 of the mounting nut 27a in a state where the insertion part 31a is directly inserted into the through-hole 25a.

In a state where the sensor unit 28a is supported and fixed to the cap 19a, a tip face of the insertion part 31a (an axially outboard end face thereof) and the axially inboard surface of the insert bottom part 48 constituting the fitting insert 44 closely face each other via a minute axial gap or come into contact with each other. In this state, the sensor 29a (of the detector) held on the tip of the insertion part 31*a* faces the detected surface of the encoder 13*a* via the insert bottom part 48.

Even in this example having the configuration as described above, the wheel fixed to the hub 3 can be rotatably supported on the suspension supporting the outer ring 2. When the encoder 13*a* is rotated together with the hub 3 with the rotation of the wheel, the N and S poles which are present on the detected surface of the encoder 13*a* alternately pass the vicinity of the detector of the sensor 29*a* facing the detected surface of the encoder 13*a* via the insert bottom part 48 of the fitting insert 44. As a result, a direction of magnetic flux flowing in the magnetism detecting element constituting the sensor 29*a* is alternately changed, and a characteristic of this magnetism detecting element is alternately changed. In this way, a frequency at which the characteristic of the magnetism detecting element is changed is proportional to the rotational speed of the hub 3. Thus, if the output signal of the sensor 29*a* is sent to a controller (not shown), an ABS or a TCS can be suitably controlled.

Particularly, in this example, sealing performance by the cap 19*a* can be sufficiently secured.

That is, in the present invention, in a state where the cap 19*a* is assembled by fitting and fixing the insert cylindrical part 47 of the fitting insert 44 into and to the inner circumferential surface of the axially inboard end of the outer ring 2, the axially inboard surface of the insert bottom part 48 closes the axially outboard end opening of the through-hole 25*a* formed in the cap bottom part 23*a*. For this reason, even when a foreign material such as water is invaded into an axially outboard end (an inner part) of the portion between the outer circumferential surface of the insertion part 31*a* constituting the sensor holder 30*a* and the inner circumferential surface of the through-hole 25*a*, the foreign material can be prevented from being invaded into the space 18 in which the rolling elements 12, 12 or the encoder 13*a* is installed by the axially inboard surface of the insert bottom part 48.

In this example, the end of the coupling surface between the cap body 20*a* and the fitting insert 44 of the cap 19*a* (the boundary surface between both the members 20*a*, 44) is not present in the space 18. That is, even when a gap is formed between the through-hole 25*a* and the insertion part 31*a* fitted into the through-hole 25*a* provided in the cap body 20*a*, which is problematic in the above-described conventional structure, this gap does not lead to the space 18. For this reason, a foreign material such as water is not invaded into the space 18 along a gap occurring at the coupling surface. Therefore, according to the present invention, the sealing performance by the cap 19*a* can be sufficiently secured In this example, the flange part 49 is formed at the fitting insert 44 and the axially inboard and outboard sides of this flange part 49 and the cap body 20*a* are axially engaged. For this reason, axial relative displacement between the fitting insert 44 and the cap body 20*a* can be prevented.

The both sides of each of the anti-rotation notches 50, 50 of the flange part 49 in the circumferential direction and the portion of the cap body 20*a* which is filled in each of the anti-rotation notches 50, 50 are engaged in the circumferential direction. For this reason, relative rotation between the fitting insert 44 and the cap body 20*a* can be prevented.

In this example, the outer circumferential surface of the insert cylindrical part 47 of the fitting insert 44 is directly fitted into the inner circumferential surface of the axially inboard end of the outer ring 2. For this reason, even in continuous use, a gap or the like is prevented from occurring at this fitting part.

Figure 12:
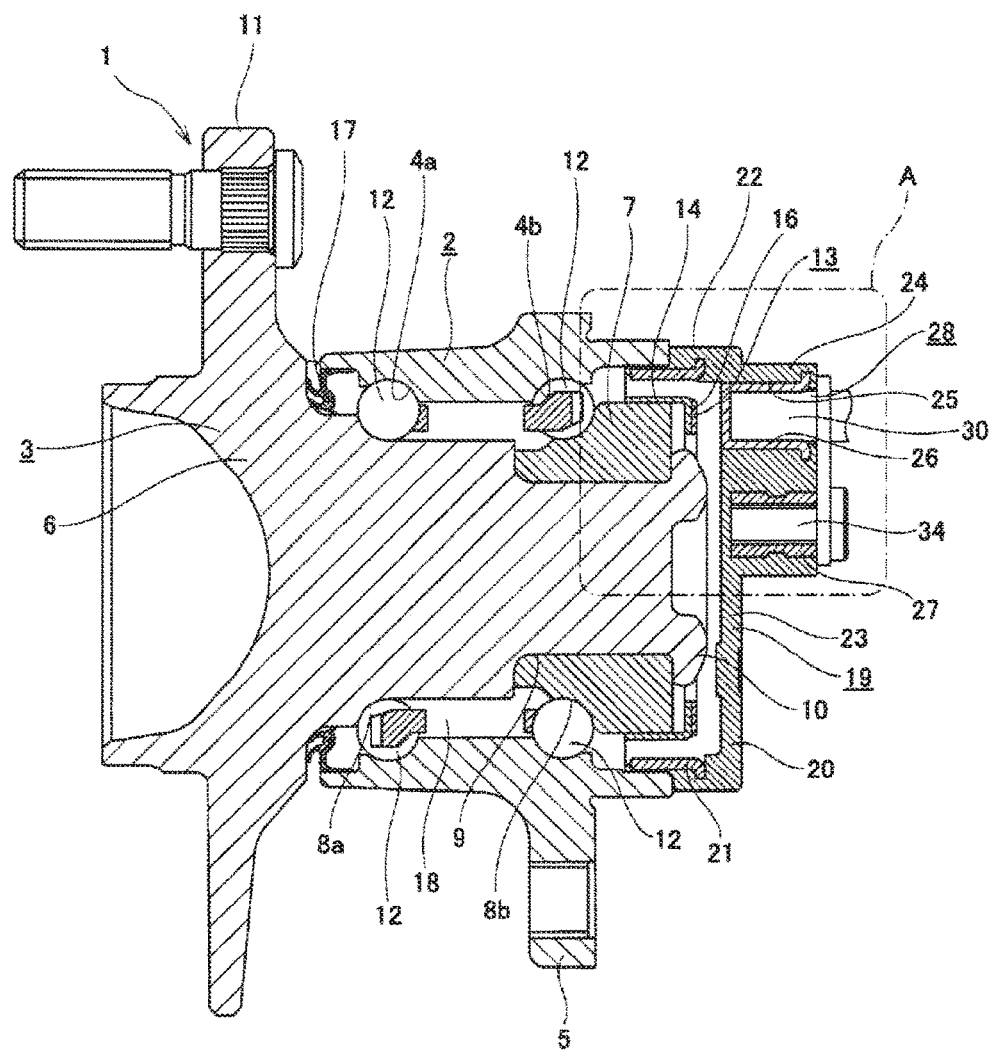
FIG. 12 is a cross-sectional view showing a conventional rolling bearing unit with a rotational speed detecting device.
Figure 13:
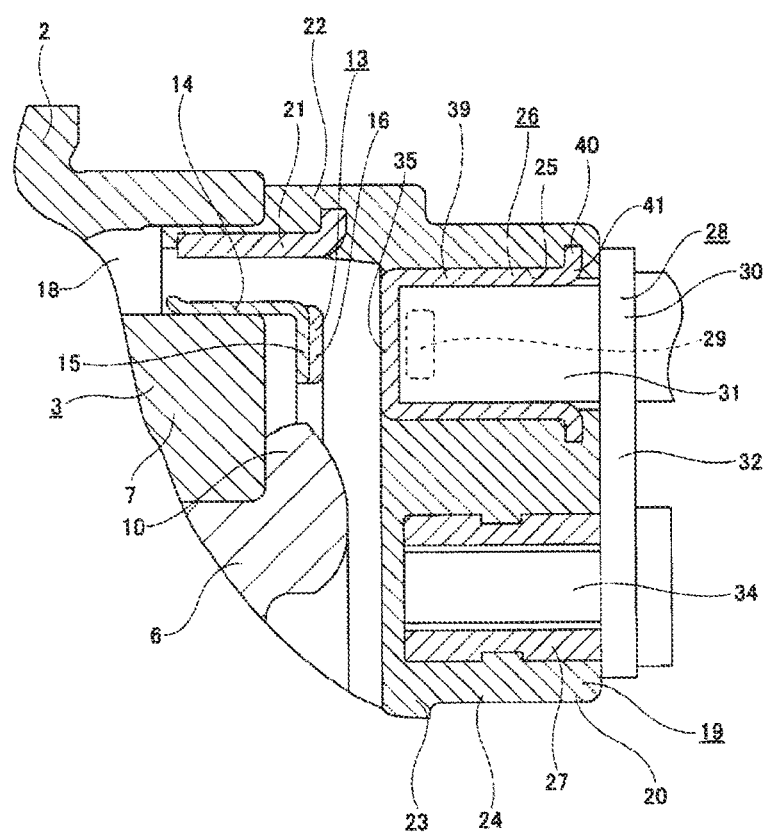
FIG. 13 is an enlarged view of a part A of FIG. 12.

That is, like the above-described conventional structure, in the structure in which the fitting ring 21 (see FIG. 12) is fitted into the inner circumferential surface of the axially inboard end of the outer ring 2 via the cap cylindrical part 22 of the cap body 20 formed of a synthetic resin, deformation such as settling is to occur at the cap cylindrical part 22 by use, and a gap is likely to occur at the fitting part between the outer ring 2 and the cap cylindrical part 22. On the other hand, in this example, the insert cylindrical part 47 made of a metal is directly metal-fitted into the outer ring 2. For this reason, the gap based on the deformation such as settling can be prevented from occurring at this insert cylindrical part 47. Therefore, according to this example, the sealing performance by the cap 19*a* can be sufficiently secured. The axial gap between the sensor 29*a* and the encoder 13*a* can also be constantly secured for a long period of time.

Further, in this example, the O-ring 53 is fitted around the portion which radially overlaps the concave groove 45 of the cap cylindrical part 22*a* out of the outer circumferential surface of the insert cylindrical part 47. For this reason, a foreign material such as water invaded from the gap between the axially inboard end face of the outer ring 2 and the axially outboard end face of the cap cylindrical part 22*a*, and the gap occurring at the coupling surface between the cap body 20*a* and the fitting insert 44 can be effectively prevented from being invaded into the fitting part between the outer circumferential surface of the insert cylindrical part 47 and the inner circumferential surface of the axially inboard end of the outer ring 2.

Second Example of Embodiment

FIGS. 4 to 7 show a second example of the embodiment of the present invention.

In a rolling bearing unit with a rotational speed detecting device of this example, insert through-holes 54, 54 passing through an insert bottom part 48*a* constituting a fitting insert 44*a* are formed at a plurality of circumferential places at a radially inner side of a middle part of the insert bottom part 48*a* with respect to a position facing a through-hole 25*a* of a mount part 24*b* in an assembled state.

In a state where the fitting insert 44*a* as described above is molded in a cap body 20*b* by injection molding, cap engagement parts 55, 55, each of which has a greater diameter dimension of an circumscribed circle than each of the insert through-holes 54, 54, are provided for portions around the insert through-holes 54, 54 at the axially outboard side with respect to an axially outboard surface of the insert bottom part 48*a*. Each of the cap engagement parts 55, 55 and the cap bottom part 23*b* are a resin portion filled inside each of the insert through-holes 54, 54, and are continuous with each other by means of cap continuous parts 56, 56. A shape of each of the cap engagement parts 55, 55 is not limited to a circular shape as shown, and various shapes may be adopted.

In this example, relative rotation between the fitting insert 44*a* and the cap body 20*b* is prohibited by circumferential engagement between an inner surface of each of the insert through-holes 54, 54 and each of the cap continuous parts 56, 56.

Axial relative displacement between the fitting insert 44*a* and the cap body 20*b* is prohibited by axial engagement between an axially outboard surface of the insert bottom part 48a and an axially inboard surface of each of the cap engagement parts 55, 55.

In this example, since the relative rotation and the axial relative displacement between the fitting insert 44a and the cap body 20b is prohibited by the configuration as described above, a flange part 49 is not formed at the fitting insert 44 like the above-described first example of the embodiment. That is, in this example, a insert cylindrical part 47a is formed by bending a radially outer end of the insert bottom part 48a axially outward at right angles. For this reason, since a folding process for forming the flange part 49 is not required when the fitting insert 44a is made by a stamping process, a process cost can be reduced. Particularly, when the fitting insert is made of an austenitic stainless steel plate, a processed portion becomes brittle due to martensitic transformation associated with plastic deformation or is magnetized, and the folding process becomes difficult in some cases. Thus, the structure of this example in which the folding process is not required as described above may be preferably adopted.

Figure 5:
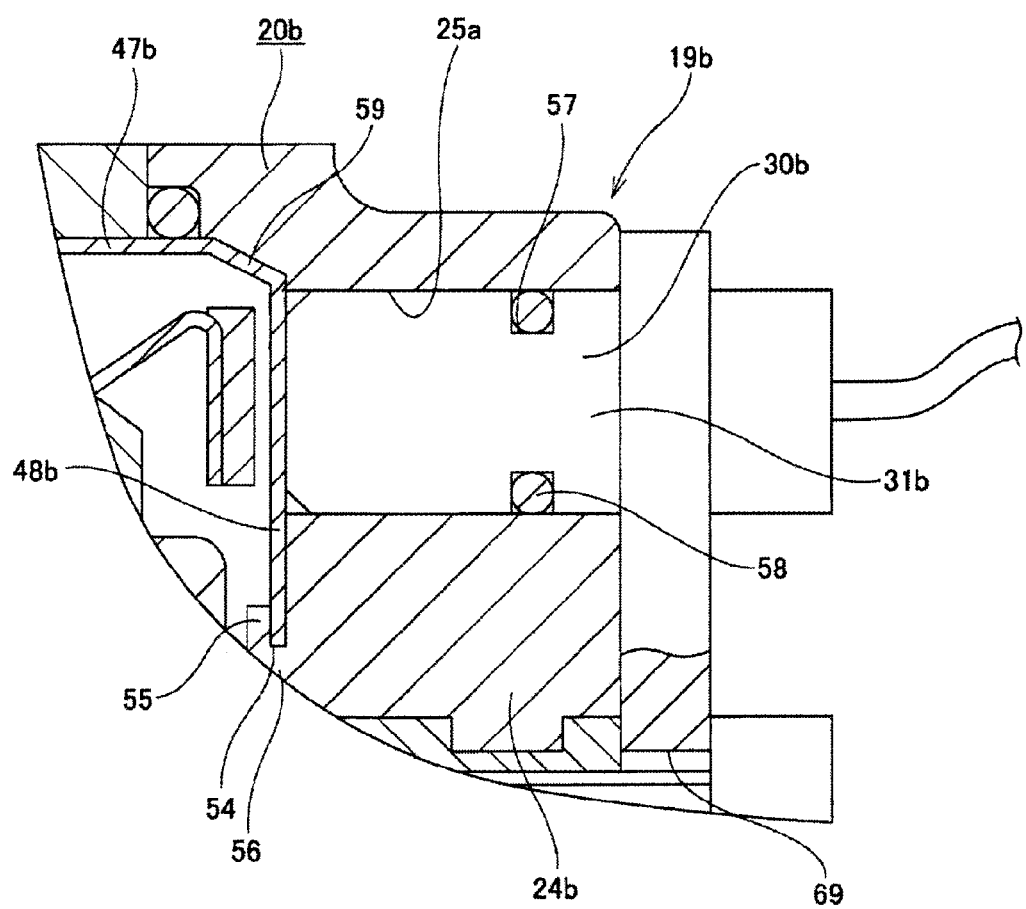
FIG. 5 is a view showing a portion which corresponds to the part B of FIG. 1 in the rolling bearing unit with the rotational speed detecting device according to the second example of the embodiment of the present invention.

When the structure of this example is implemented, as shown in FIG. 5, an oblique part 59, which is inclined to the axially outboard side toward the radially outer side, is formed at a radially outer end side portion of a insert bottom part 48b, and a radially outer end of this oblique part 59 is bent to the axially outboard side in a state where it is orthogonal to the insert bottom part 48b. Thereby, an insert cylindrical part 47b can also be formed. In this case, a force for the bending process when the fitting insert is made is further reduced.

In this example, a concave groove 57 is formed at an axially outboard end side portion of an outer circumferential surface of an insertion part 31b constituting a sensor holder 30b throughout the circumference. An O-ring 58 made of a rubber having a circular cross-sectional shape is set to this concave groove 57. In a state where the insertion part 31b of the sensor holder 30b is inserted into the through-hole 25a of the mount part 24b, this O-ring 58 is sandwiched between an inner circumferential surface of the through-hole 25a and a bottom part of the concave groove 57 in a state where it is elastically compressed. In this way, a foreign material such as water is prevented from being invaded between the inner circumferential surface of the through-hole 25a and an axially outboard portion with respect to the concave groove 57 out of the outer circumferential surface of the insertion part 31b.

Figure 6:
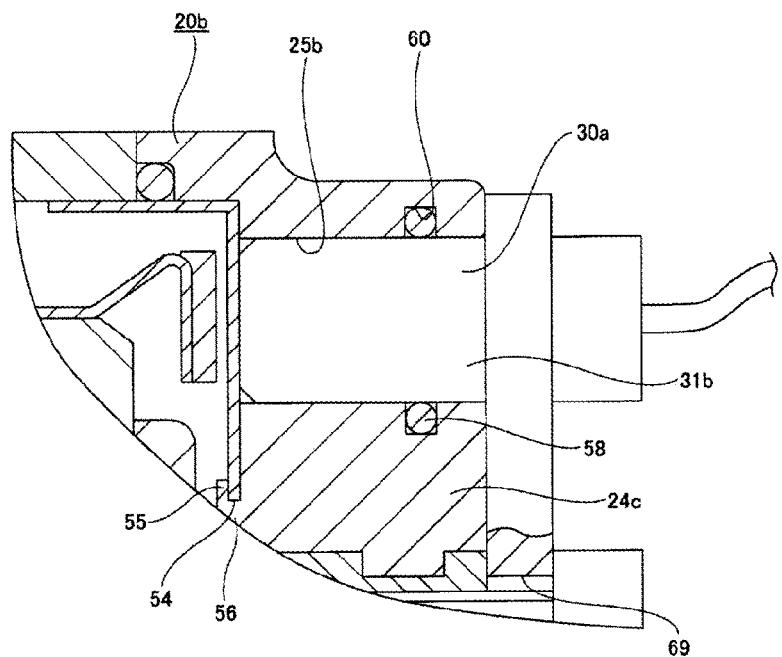
FIG. 6 is a view showing an example of a seal structure between an inner circumferential surface of a through-hole of a cap body and an outer circumferential surface of an insertion part of a sensor holder in the second example of the embodiment of the present invention.

In this example, the concave groove 57 for setting the O-ring 58 is provided in the outer circumferential surface of the insertion part 31b. However, for example, as shown in FIG. 6, without forming the concave groove in the insertion part 31b, a concave groove 60 may be formed in the inner circumferential surface of the through-hole 25b of the mount part 24c. Since this concave groove 60 cannot be formed by injection molding, it is formed by cutting or the like after a cap is made by injection molding.

Figure 7:
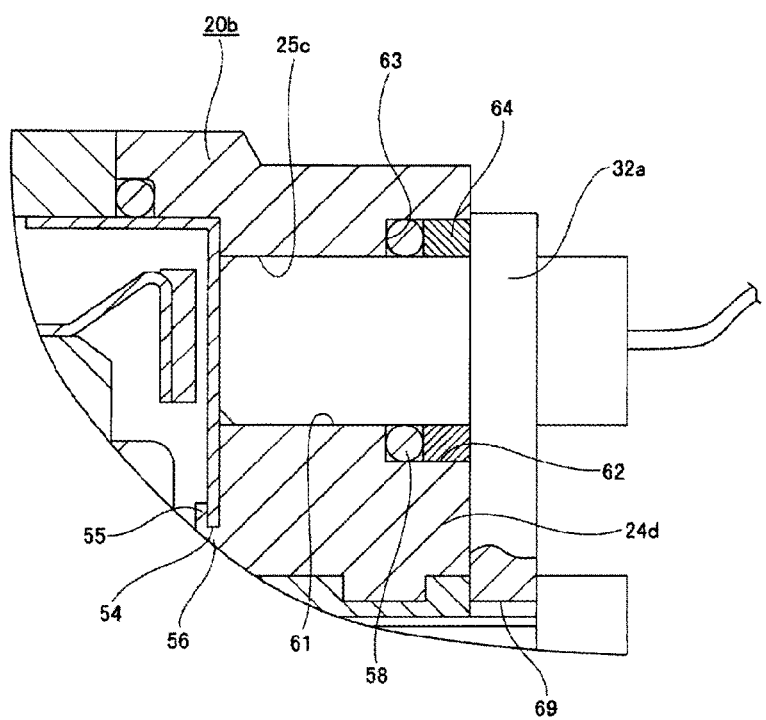
FIG. 7 is a view showing another example of the seal structure between the inner circumferential surface of the through-hole of the cap body and the outer circumferential surface of the insertion part of the sensor holder in the second example of the embodiment of the present invention.

On the other hand, as shown in FIG. 7, an inner circumferential surface of a through-hole 25c of a mount part 24d may be formed in a stepped cylindrical shape in which a small diameter part 61 provided axially outboard and a large diameter part 62 provided axially inboard are continuous with each other via a step part 63. In this structure, the O-ring 58 is fitted into an axially outboard end of the large diameter part 62, and a cylindrical plug member 64 made of a synthetic resin or a rubber is fitted into an axially inboard portion of this large diameter part 62 with respect to a position at which this O-ring 58 is internally fitted. In this way, the O-ring 58 is prevented from being axially displaced inside the large diameter part 62. The plug member 64 stops axially coming out of an axially outboard surface of the mounting flange part 32a constituting the sensor holder 30a.

When this example is implemented, the flange part 49 is formed at the fitting insert 44a like the above-described first example of the embodiment, and the relative rotation and the axial relative displacement between the fitting insert 44a and the cap body 20b can be further prevented.

The other configurations and operation and effects are the same as in the above-described first example of the embodiment.

Third Example of Embodiment

Figure 8:
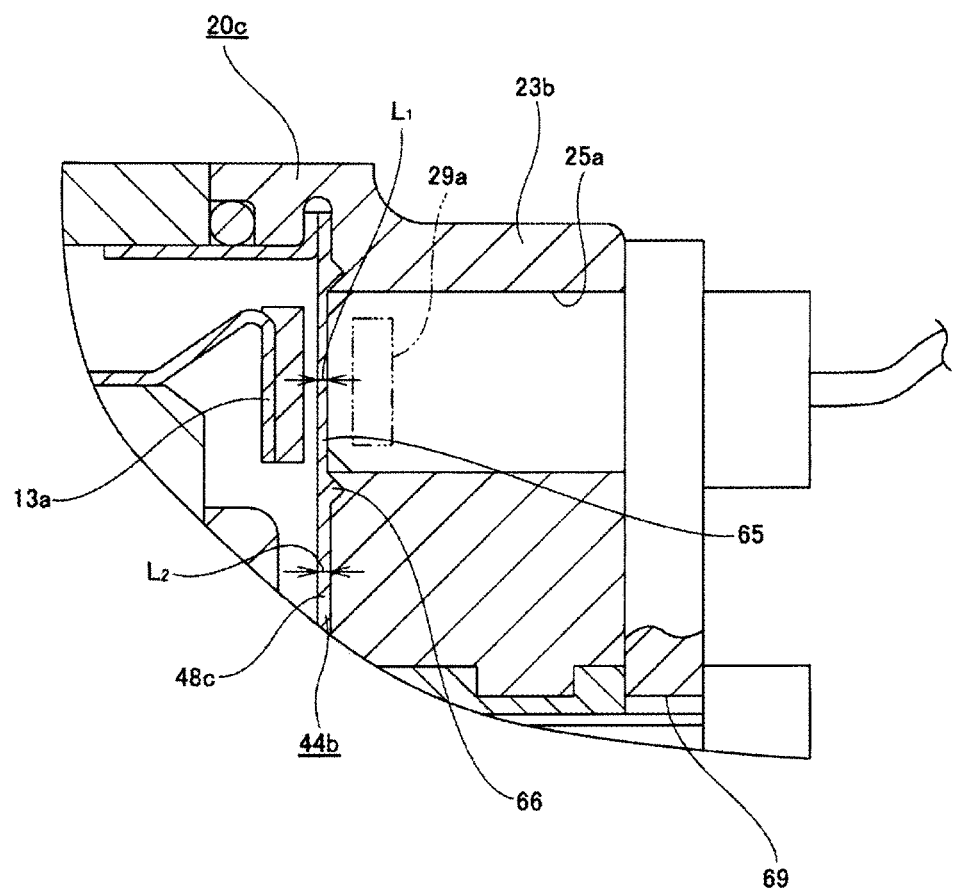
FIG. 8 is an enlarged view showing a portion which corresponds to the part B of FIG. 1 in a rolling bearing unit with a rotational speed detecting device according to a third example of the embodiment of the present invention.

FIG. 8 shows a third example of the embodiment of the present invention.

In a rolling bearing unit with a rotational speed detecting device of this example, a sensor seating surface 65 is formed at a portion, which faces a through-hole 25a of a cap bottom part 23b constituting a cap body 20c, of an axially inboard surface of an insert bottom part 48c of a fitting insert 44b, and has an axial thickness dimension L1 smaller than an axial thickness dimension L2 of the other portion (L1<L2). In this example, this sensor seating surface 65 is formed, for example, by coining a portion, which faces the through-hole 25a, of a fitting insert 44 (see FIG. 1) whose axially inboard surface is flat like the above-described first example of the embodiment, and moving a part of a metal, which is present in the portion, to a periphery of the relevant portion. In this example, with the formation of the sensor seating surface 65 according to the coining process as described above, an annular ridge part 66 is formed around the sensor seating surface 65, and protrudes axially inward with respect to the other portion of the axially inboard surface of the insert bottom part 48c. The formation of this sensor seating surface 65 is performed before the fitting insert 44b is molded in the cap body 20c by injection molding.

According to this example, detection accuracy is improved by reducing an axial distance between a detector of a sensor 29a and a detected surface of an encoder 13a.

In this example, the annular ridge part 66 of the fitting insert 44b and a portion of the cap body 20c which exists around this annular ridge part 66 are engaged in a circumferential direction of this cap body 20c, and thereby anti-rotation of the fitting insert 44b and the cap body 20c is promoted. This example may also be applied to the fitting insert as in the above-described second example of the embodiment.

The other configurations and operation and effects are the same as in the above-described first example of the embodiment.

Fourth Example of Embodiment

Figure 9:
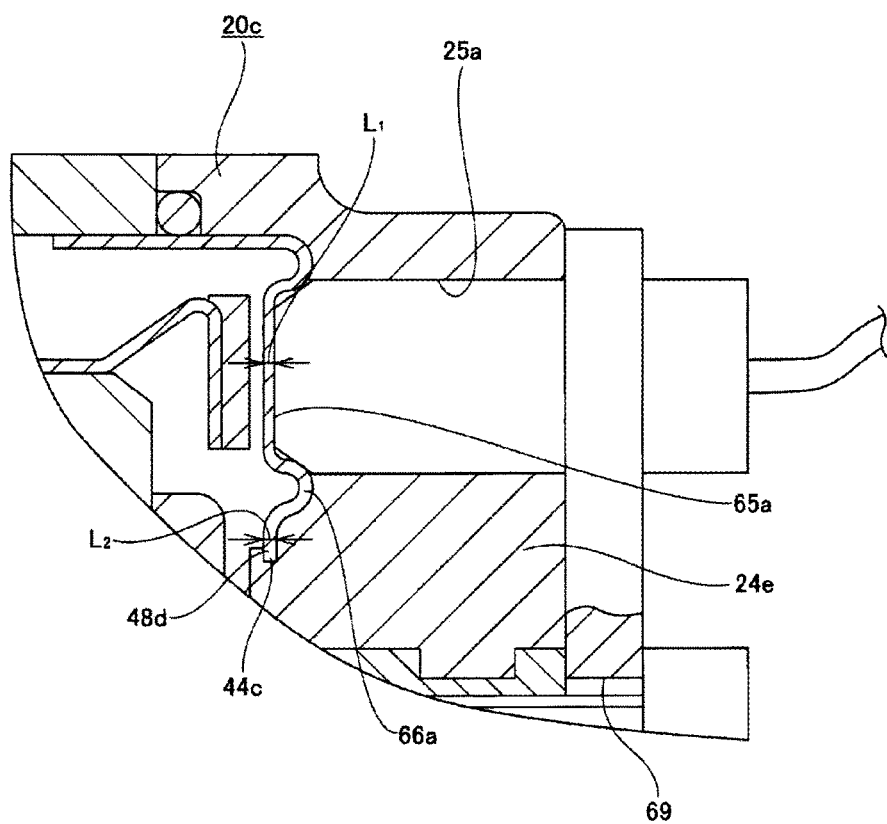
FIG. 9 is an enlarged view showing a portion which corresponds to the part B of FIG. 1 in a rolling bearing unit with a rotational speed detecting device according to a fourth example of the embodiment of the present invention.

FIG. 9 shows a fourth example of the embodiment of the present invention.

In a rolling bearing unit with a rotational speed detecting device of this example, a sensor seating surface 65a is formed at a portion, which faces a through-hole 25a of a mount part 24e constituting a cap body 20c, of an axially inboard surface of an insert bottom part 48d of a fitting insert 44c, and has an axial thickness dimension L1 smaller than an axial thickness dimension L2 of the other portion (L1<L2). In this example, this sensor seating surface 65a is formed, for example, by bending a periphery of a portion, which faces the through-hole 25a, of a fitting insert 44a (see FIGS. 4A and 4B) whose axially inboard surface is flat like the above-described second example of the embodiment, and stretching a portion corresponding to the sensor seating surface 65a. In this example, with the formation of the sensor seating surface 65a according to the bending process as described above, an annular ridge part 66a is formed around the sensor seating surface 65a and protrudes axially inward with respect to the other portion of the axially inboard surface of the insert bottom part 48d. The formation of this sensor seating surface 65a is performed before the fitting insert 44c is molded in the cap body 20c by injection molding. In this example, a shape of the ridge part formed by bending is not limited to the annular shape. For example, a linear ridge part may be formed by bending only both the side portions in the radial direction out of a periphery of the portion corresponding to the sensor seating surface 65a or only both the side portions in the circumferential direction. Even in this case, this linear ridge part is formed, and thereby the portion corresponding to the sensor seating surface 65a is stretched.

According to this example, detection accuracy is improved by reducing an axial distance between a detector of a sensor 29a and a detected surface of an encoder 13a.

In this example, the annular ridge part 66a of the fitting insert 44c and a portion of the cap body 20c which exists around this annular ridge part 66a are engaged in a circumferential direction of this cap body 20c, and thereby anti-rotation of the fitting insert 44b and the cap body 20c is promoted. This example may also be applied to the fitting insert as in the above-described second example of the embodiment.

The other configurations and operation and effects are the same as in the above-described first example of the embodiment.

Fifth Example of Embodiment

Figure 10:
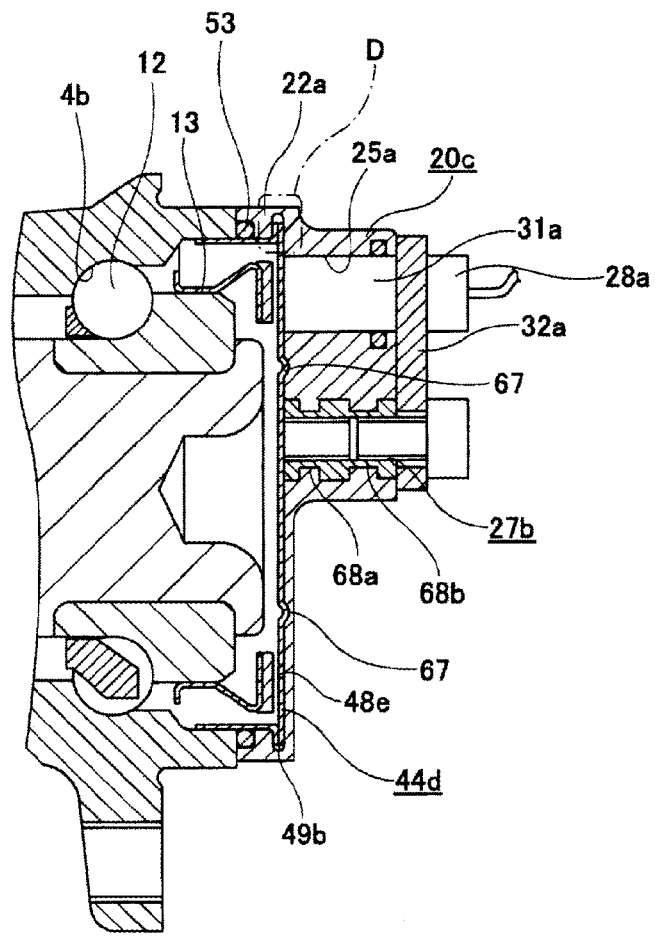
FIG. 10 is a view showing a portion which corresponds to the part C of FIG. 1 in a rolling bearing unit with a rotational speed detecting device according to a fifth example of the embodiment of the present invention.
Figure 11:
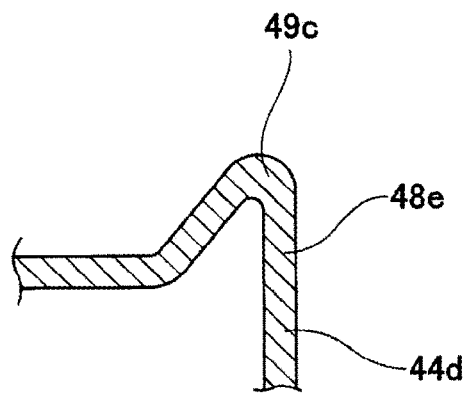
FIG. 11 is a view showing an example of a configuration of a flange part at a part D of FIG. 10.

FIGS. 10 and 11 show a fifth example of the embodiment of the present invention.

In a rolling bearing unit with a rotational speed detecting device of this example, engagement ridge parts 67, 67 having arc-shaped cross sections are formed at a plurality of circumferential places at a radially inner side of a middle part of an axially inboard surface of an insert bottom part 48e constituting a fitting insert 44d, and protrude axially inward with respect to the other portion. In this example, each of the engagement ridge parts 67, 67 is formed by, for instance, a stamping process before the fitting insert 44d is molded in a cap body 20c by injection molding.

In this example, as a mounting nut 27b, a nut having a structure in which axially inboard and outboard ends are open is adopted. Concave grooves 68a, 68b are formed throughout the circumference at two positions separated in the axial direction of an outer circumferential surface of this mounting nut 27b. This mounting nut 27b is buried in the cap body 20c by insert molding in a state where an axially outboard end face of this mounting nut 27b is brought into contact with (closed with) an axially inboard surface of the insert bottom part 48e. Therefore, even in this example, as in the case in which a mounting nut (a cap nut), an axially outboard end (an inner part) of which is closed, is adopted, the mounting nut does not need to be screwed on the external threads as shown in FIG. 14 at the insert molding. As a result, workability of the insert molding can be improved.

In this example having the configuration as described above, each of the engagement ridge parts 67, 67 and a portion of the cap body 20c which exists around each of the engagement ridge parts 67, 67 are engaged in a circumferential direction of this cap body 20c, and thereby relative rotation between the fitting insert 44d and the cap body 20c in a circumferential direction is prohibited. In place of the engagement ridge parts 67, 67, a structure in which engagement recess parts (not shown) recessed axially outward with respect to the other portion are formed in the axially inboard surface of the insert bottom part 48e may be adopted. In this case, each of the engagement recess parts and a portion of the cap body which is filled inside each of the engagement recess parts are engaged in the circumferential direction of this cap body, and thereby relative displacement between the fitting insert and the cap body in the circumferential direction can be prohibited. In this example, the anti-rotation notches 50, 50 (see FIGS. 2A and 2B) as in the above-described first example of the embodiment may not be formed in a flange part 49b of the fitting insert 44d.

If a structure in which the anti-rotation notches are not formed in this way is adopted, the flange part may be formed to have an approximately triangular cross section like the flange part 49c shown in FIG. 11. As a result, when this flange part 49c is formed, a force for a process is reduced.

The other configurations and operation and effects are the same as in the above-described first example of the embodiment.

The present application has been described in detail with reference to the specific embodiments, but it is apparent to those skilled in the art that various changes or modifications can be made without departing the spirit and scope of the present invention.

The present application is based on Japanese Patent Application No. 2014-038325, filed on Feb. 28, 2014, the content of which is incorporated herein by reference.

INDUSTRIAL APPLICABILITY

The present invention can be carried out by appropriately combining the examples of the above-described embodiment.

DESCRIPTION OF REFERENCE NUMERALS 1, 1a: Rolling bearing unit with rotational speed detecting device
2: Outer ring
3: Hub
4a, 4b: Outer ring raceway
5: Stationary-side flange
6: Hub body
7: Inner ring
8a, 8b: Inner ring raceway
9: Small diameter step part
10: Caulking part
11: Rotation-side flange
12: Rolling element
13, 13a: Encoder
14, 14a: Support ring
15, 15a: Circular ring part
16, 16a: Encoder body
17: Seal ring
18: Space
19, 19a, 19b: Cap
20, 20a, 20b, 20c: Cap body
21: Fitting ring
22, 22a: Cap cylindrical part
23, 23a, 23b: Cap bottom part
24, 24a, 24b, 24c, 24d, 24e: Mount part 25, 25a, 25b, 25c: Through-hole
26: Sensor insertion cup
27, 27a, 27b: Mounting nut
28, 28a: Sensor unit
29, 29a: Sensor
30, 30a, 30b: Sensor holder
31, 31a, 31b: Insertion part
32, 32a: Mounting flange part
33: External thread part
34: Bolt
35: Bottom plate part
36: Upper molding die
37: Lower molding die
38: Cavity
39: Cylindrical part
40: Flange part
41: Bent part
42: Fitting cylinder part
43: Outward flange part
44, 44a, 44b, 44c, 44d: Fitting insert
45: Concave groove
46: Holding hole part
47, 47a, 47b: Insert cylindrical part
48, 48a, 48b, 48c, 48d, 48e: Insert bottom part
49, 49a, 49b, 49b, 49c: Flange part
50: Anti-rotation notch
51: Internal thread part
52: Concave groove
53: O-ring
54: Insert through-hole
55: Cap engagement part
56: Continuous part
57: Concave groove
58: O-ring
59: Oblique part
60: Concave groove
61: Small diameter part
62: Large diameter part
63: Step part
64: Plua member
65, 65a: Sensor seating surface
66, 66a: Annular ridge part
67: Engagement ridge part
68a, 68b: Concave groove
69: Through-hole

The invention claimed is:

1. A rolling bearing unit with a rotational speed detecting device, the rolling bearing unit comprising:
an outer ring which includes double rows of outer ring raceways on an inner circumferential surface thereof and is not rotatable when used;
a hub which includes double rows of inner ring raceways on an outer circumferential surface thereof, is supported concentrically with the outer ring at an inner diameter side of the outer ring and is provided with a rotation-side flange for supporting a wheel at a portion of an outer circumferential surface which axially protrudes outward with respect to an axially outboard end of the outer ring;
a plurality of rolling elements which are rollably provided for each row between the outer ring raceways and the inner ring raceways, respectively;
an annular encoder which is configured by alternately changing magnetic characteristics on an axially inboard surface thereof and is supported to an axially inboard end of the hub concentrically with the hub;
a cap which is mounted on an axially inboard end of the outer ring and closes an axially inboard end opening of the outer ring;
a sensor unit which includes:
a sensor which is provided to face a detected surface of the encoder and configured to change an output signal in response to a change in characteristic of the detected surface of the encoder; and
a sensor holder including a sensor holding part which holds the sensor and is supported by a portion of the cap axially facing the encoder, and a sensor mounting flange part which is provided at a base end of the sensor holding part and is coupled and fixed to an axially inboard surface of the cap,
wherein the cap includes a cap body, a fitting insert, and a mounting nut,
wherein the cap body is formed of a synthetic resin as a whole, has a bottomed cylindrical shape including a cap cylindrical part and a cap bottom part, and is formed with a through-hole in a portion of the cap bottom part which axially faces the encoder,
wherein the fitting insert is formed of a non-magnetic material as a whole, has a bottomed cylindrical shape including an insert cylindrical part and an insert bottom part, and is fixed to an inner diameter side of the cap cylindrical part in a state where the fitting insert is open axially outward and an axially outboard end opening of the through-hole is closed by the insert bottom part,
wherein the mounting nut is molded in the cap body in a state where the mounting nut is open to an axially inboard surface of the cap body and is used to screw a bolt inserted through a hole of the sensor mounting flange part in a state where the sensor holding part is inserted to the through-hole, and
wherein the cap is mounted on an axially inboard end of the outer ring in a state where the insert cylindrical part of the fitting insert is fitted into and fixed to the axially inboard end of the outer ring.

2. The rolling bearing unit according to claim 1,
wherein an axial thickness dimension of a portion of the insert bottom part of the fitting insert, which axially faces the through-hole, is smaller than a thickness dimension of a remaining portion of the insert bottom part other than the portion.

3. The rolling bearing unit according to claim 1,
wherein a seal member is provided at a portion between an inner circumferential surface of the through-hole and an outer circumferential surface of the sensor holding part.

4. The rolling bearing unit according to claim 1,
wherein the mounting nut has a tubular shape, both ends of which are axially open, and
wherein an axially inboard end opening of the mounting nut is open to an axially inboard surface of the cap bottom part, and the mounting nut is disposed in a state where an axially outboard end opening thereof is closed by the insert bottom part.

5. The rolling bearing unit according to claim 1,
wherein an anti-rotation structure for prohibiting relative rotation between the fitting insert and the cap body by engagement between the fitting insert and the cap body in a circumferential direction is provided between the fitting insert and the cap body.

6. The rolling bearing unit according to claim 1,
wherein a retaining mechanism for prohibiting axial relative displacement between the fitting insert and the cap body by axial engagement between the fitting insert and the cap body is provided between the fitting insert and the cap body.

7. The rolling bearing unit according to claim 1,
wherein the insert cylindrical part is directly fitted into the axially inboard end of the outer ring.

8. The rolling bearing unit according to claim 7,
wherein a concave groove, which is open to an axially outboard side and a radially inner side, is formed throughout an inner circumferential surface of an axially outboard end of the cap cylindrical part, and
wherein in a state where an axially outboard end face of the cap cylindrical part comes into contact with an axially inboard end face of the outer ring, an annular seal member is fitted around a portion, which radially overlaps the concave groove, of the outer circumferential surface of the insert cylindrical part, and is axially sandwiched between the axially inboard end face of the outer ring and an axial side surface of the concave groove.

* * * * *